W. C. WRIGHT.
MACHINE FOR MARKING SHOE UPPERS.
APPLICATION FILED JUNE 28, 1913.
1,125,624.
Patented Jan. 19, 1915.
6 SHEETS—SHEET 5.
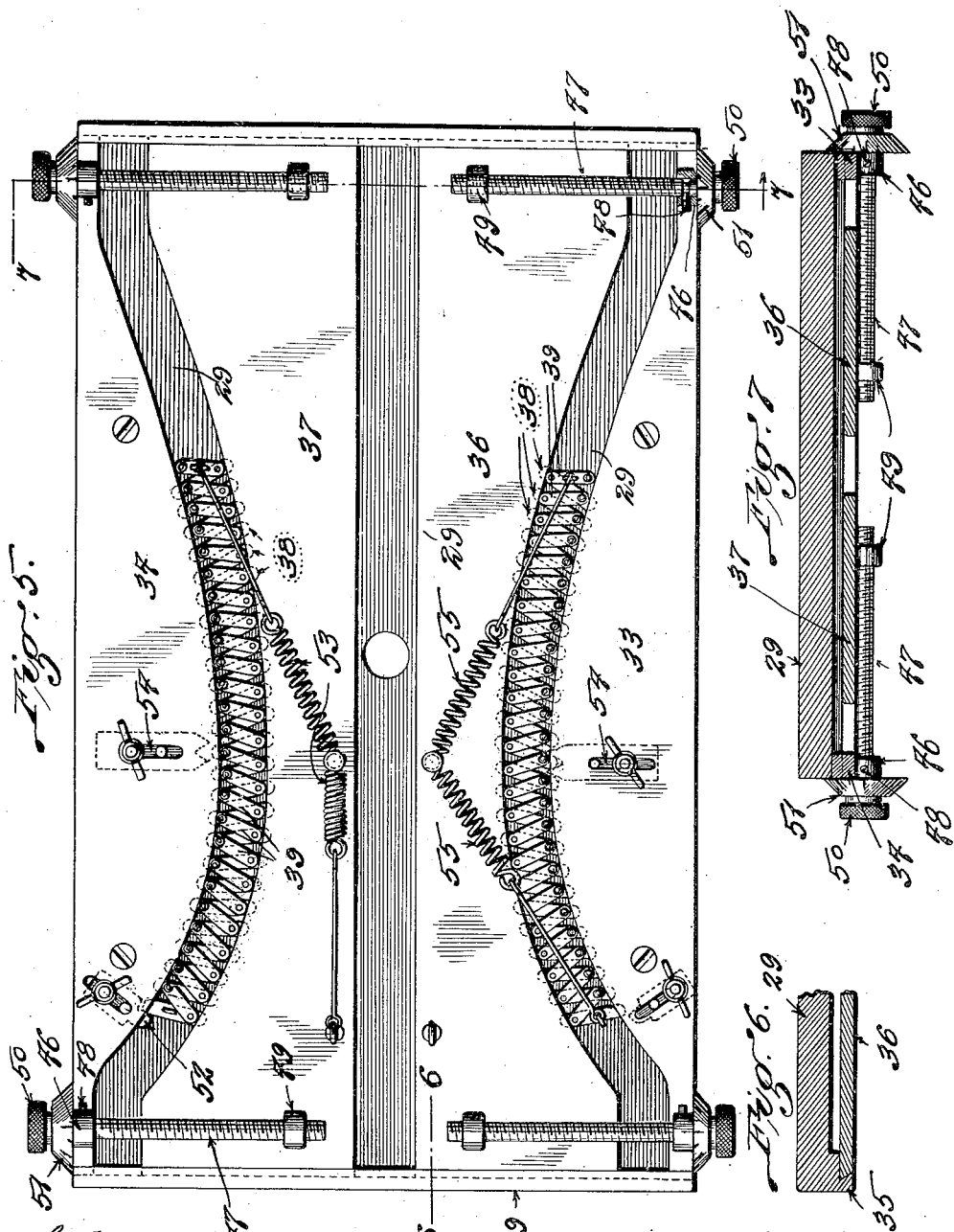

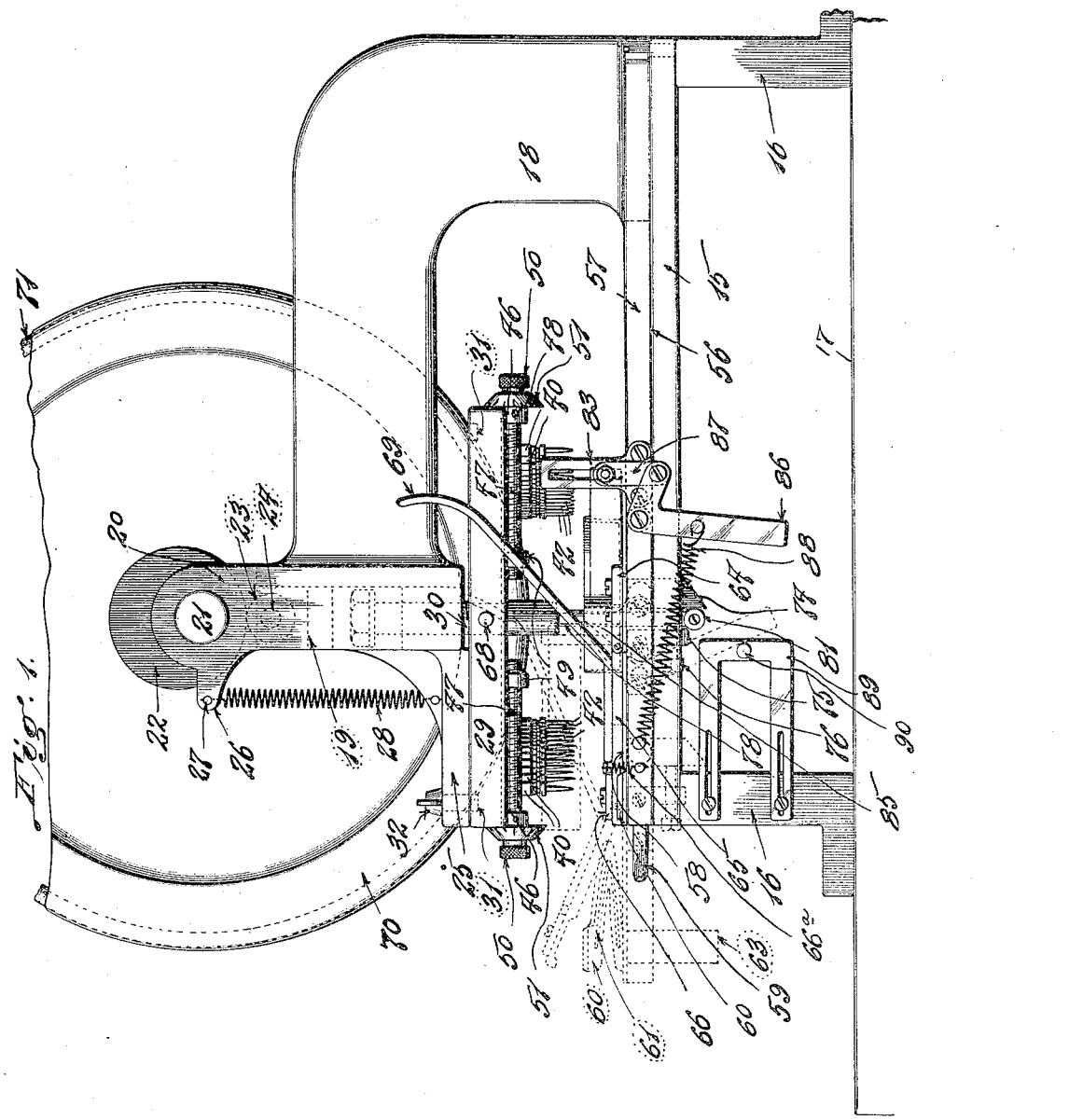

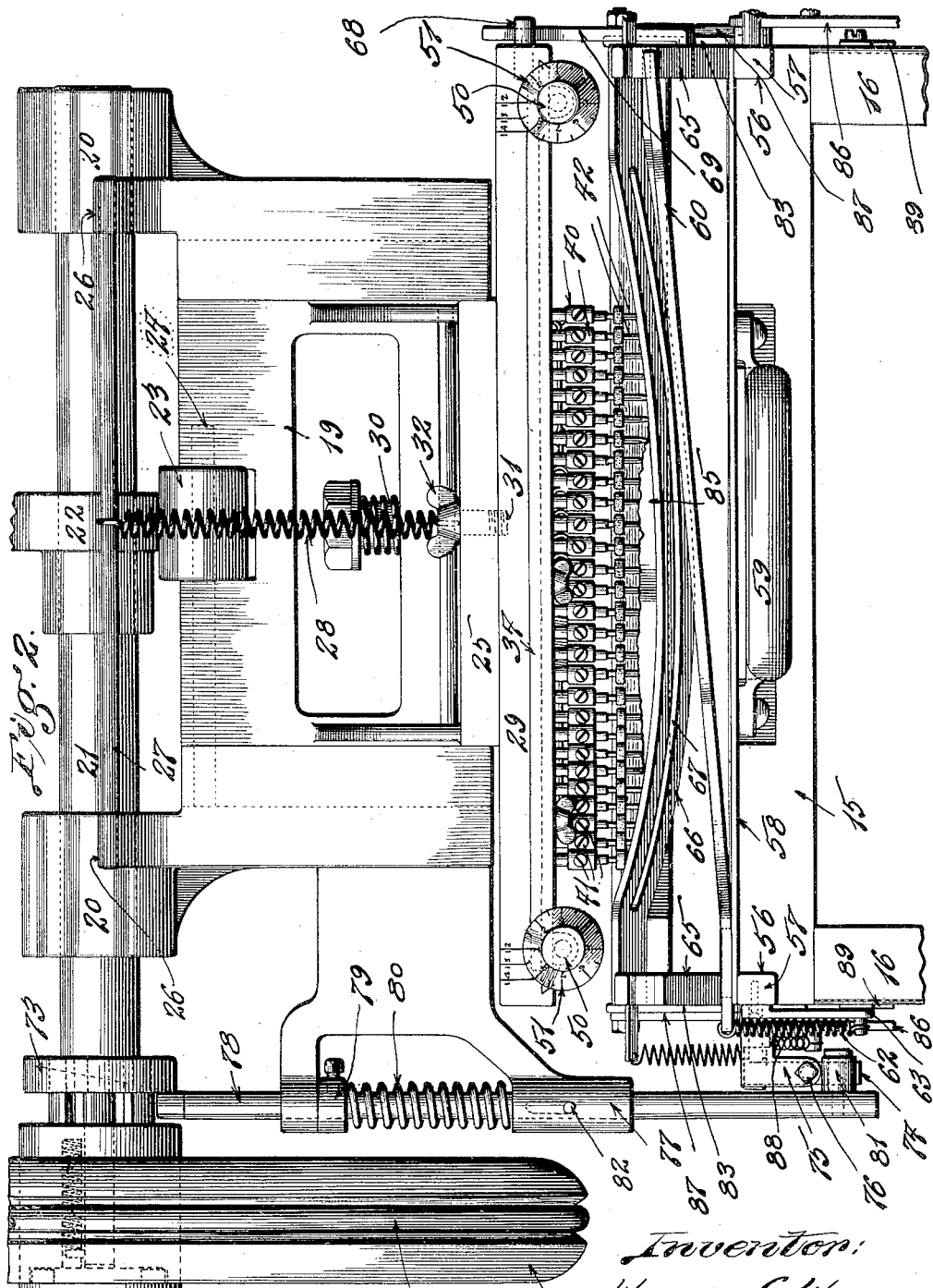

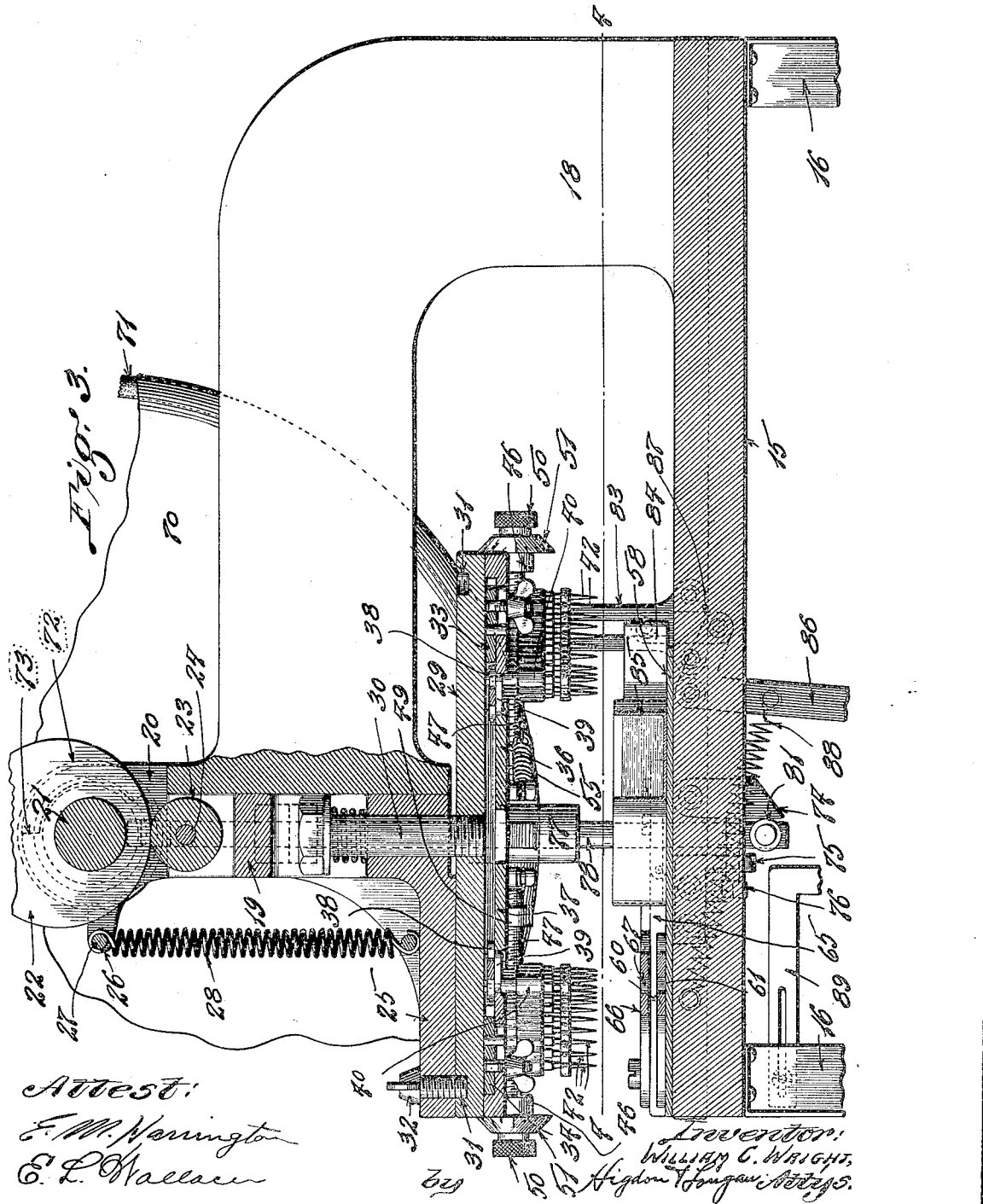

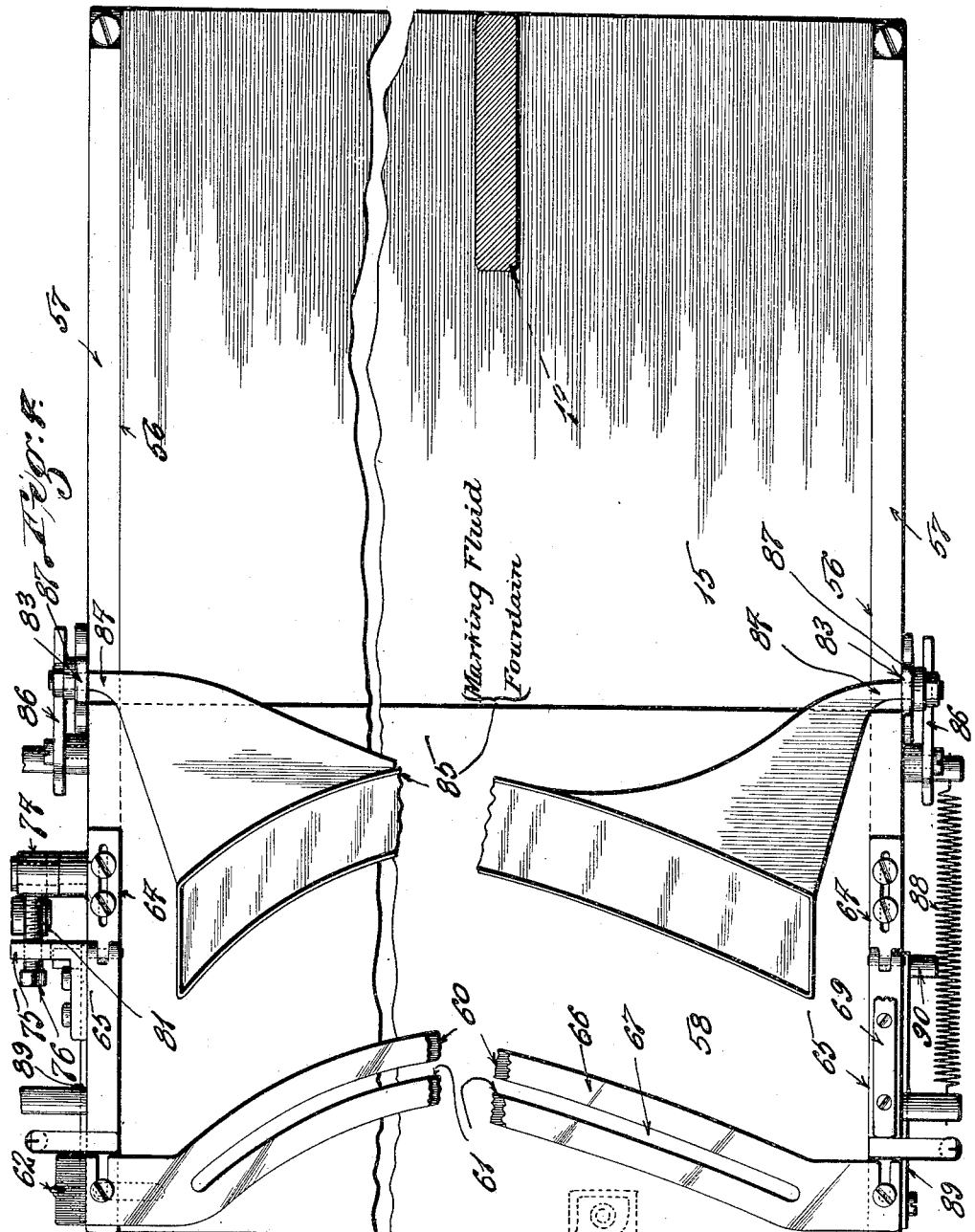

W. C. WRIGHT.
MACHINE FOR MARKING SHOE UPPERS.
APPLICATION FILED JUNE 28, 1913.
1,125,624.
Patented Jan. 19, 1915.
6 SHEETS—SHEET 6.
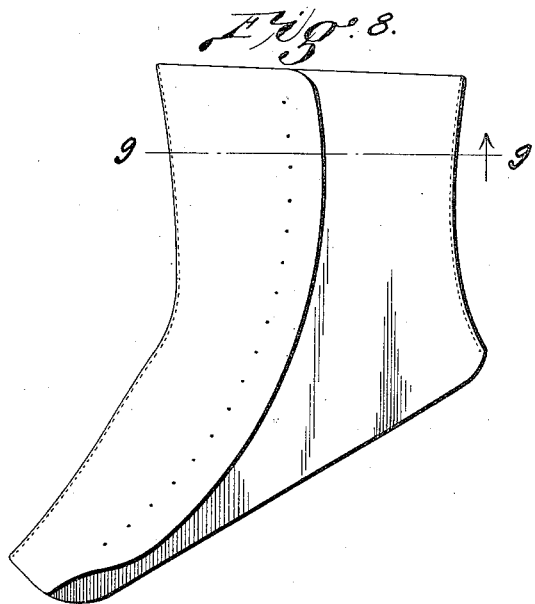
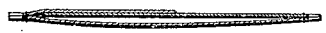
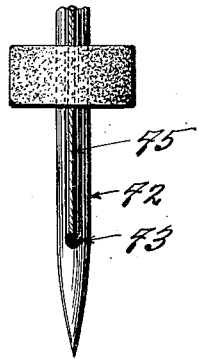 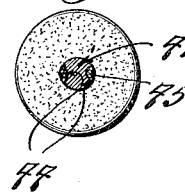 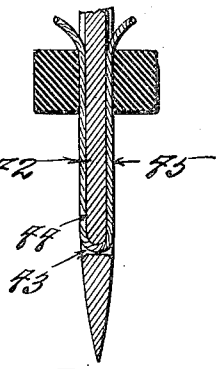

UNITED STATES PATENT OFFICE.

WILLIAM C. WRIGHT, OF ST. LOUIS, MISSOURI.

MACHINE FOR MARKING SHOE-UPPERS.

1,125,624.  Specification of Letters Patent.  Patented Jan. 19, 1915.

Application filed June 28, 1913.  Serial No. 776,312.

*To all whom it may concern:*

Be it known that I, WILLIAM C. WRIGHT, a citizen of the United States, and resident of St. Louis, Missouri, have invented certain new and useful Improvements in Machines for Marking Shoe-Uppers, of which the following is a specification containing a full, clear, and exact description, reference being had to the accompanying drawings, forming a part hereof.

My invention relates to improvements in machines for marking shoe uppers, and the object of my invention is to construct a machine for marking on shoe uppers the location of the buttons and button holes, in which machine there is a power-reciprocated head carrying a right and left set of shoe marking devices in the form of needles and to arrange the head so that it may be moved in order that the desired set of marking devices may be put in operative position.

A further object of my invention is to construct a machine having a reversible head carrying right and left sets of marking devices with a movable element in the form of a combined work-support and clamp arranged to be manually operated for movement relative to the marking devices in order to facilitate the placing and removal of work.

A further object of my invention is to construct a machine for marking shoe uppers which is power driven and normally idle and to arrange a means whereby a movement of the work-support, to a position for marking, will set the machine in motion.

A further object of my invention is to construct a means whereby the marking devices may be supplied with a marking fluid.

With the above purposes in view my invention consists in certain novel features of construction and arrangement of parts which will be hereinafter more fully described, pointed out in the claims and illustrated by the accompanying drawings, in which—

Figure 1 is a side elevation of a machine constructed according to my invention, showing in dotted lines the position of the work-support and clamp when extended to receive work; Fig. 2 is a front elevation of the machine with the parts in positions to receive work, certain elements of the machine being broken away; Fig. 3 is a longitudinal, sectional elevation taken approximately on a median line of Fig. 2, the work-support and marking fluid fountain being in a different position from that shown in Fig. 2; Fig. 4 is a detail sectional plan taken approximately on the line 4—4 of Fig. 3, the clutch rod being removed and the guides for the marking fluid fountain being shown in solid lines; Fig. 5 is an inverted plan of the reversible head showing the means for varying the spacing of the marking devices; Fig. 6 is a fragmental longitudinal sectional elevation taken on the line 6—6 of Fig. 5; Fig. 7 is a transverse sectional elevation taken on the line 7—7, Fig. 5; Fig. 8 is a plan of a shoe upper, as marked by my machine; Fig. 9 is a transverse sectional elevation taken on the line 9—9 of Fig. 8; Fig. 10 is an enlarged detail illustration of one of my improved marking devices; Fig. 11 is a plan of the marking device shown in Fig. 10; and Fig. 12 is an enlarged vertical sectional elevation of the marking device.

Referring by numerals to the accompanying drawings: 15 designates the bed plate, which is provided with the feet 16 arranged to support the machine on a table 17 or the like.

18 designates an arm, preferably formed integral with the bed plate 15 and having its free end standing in a plane above the bed plate. Formed in the free end of the arm 18 there are guides between which there is arranged for vertical reciprocation a head 19. At the top of each of said guides there is a bearing 20 in which is arranged for rotation a shaft 21. Carried by the shaft, between the bearings 20, is an eccentric 22 arranged to bear downwardly upon a roller 23 supported by a shaft 24 carried by the vertically movable head 19. Formed at the bottom of the movable head 19 there is a base or foot 25. Projecting forwardly from the bearings 20 there are arms 26 arranged for the support of a rod 27.

28 designates a contractile coil spring connected at its one end to the foot 25 of the movable head and at its other end with the rod 27, which spring is arranged to operate the movable head in opposition to the eccentric 22.

29 designates a reversible plate arranged to be pivotally secured to the head 19 by means of a bolt 30 Fig. 3 for purposes hereinafter made clear. At each end of the plate there is an internally threaded screw seat 31, and carried by the foot 25 of the movable head 19 there is a set screw 32 arranged to seat in one or the other of the screw seats 31 for fixing the position of the plate 29 relative to the movable head. Fixed on the underneath face of the plate 29 are templets 33 and 34, Fig. 5 the inner margins of which templets are shaped to conform with the curvilinear line of buttons and button holes. At the end margin of the plate 29 there are the depending flanges 35 Fig. 6, and mitered to said depending flanges are the movable templets 36 and 37, the bodies of all of said templets being spaced apart from the plate 29 whereby to receive the ends of the links 38 whose companions 39 are disposed in the space between the curved faces of the pairs of templets, that is to say between a fixed templet and a movable templet there is a plurality of connected links. At one end of each of the links 39, that is the links which are arranged between the two templets, there is a needle-holder 40 Fig. 3. Each needle-holder carries a set screw 41 Fig. 2 whereby to secure a needle or other marking device.

42 Fig. 12 designates the marking device preferably in the form of a needle or other perforating device. Adjacent the point of the needle there is an eye 43 and extending lengthwise of the needle at diametrically opposite points there are the grooves or channels 44. These channels and the eye are arranged to receive a section 45 of absorbent or bibulous material. For the movement of the movable templets 36 and 37 to engage with the links to vary their spacing, I have provided a bearing 46 Fig. 5 at each end of the fixed templets 33 and 34 arranged for the support of threaded shafts 47 whose axial movements are fixed by means of the pins 48 inserted through the bearings 46 and engaging in the circumferential grooves formed in the threaded shafts. These shafts 47 are arranged for threaded connection with ears 49 carried by the movable templets 36 and 37. Each of the shafts 47 is provided with a knurled head 50 and carried by each of the shafts and rotatable therewith is a dial 51 bearing characters indicating the sizes of shoes. It is obvious from this arrangement that when the shafts 47 are rotated the movable templets will be moved relative to the fixed templets and the space between the fixed templets and movable templets varied.

In the upper portion of Fig. 5 there is shown an adjustable abutment 52 arranged to engage a terminal link, the opposite terminal link having secured thereto a contractile coil spring 53 arranged to act on the links so that they will fill the space between the fixed and movable templet. At the bottom of Fig. 5, I have shown an adjustable abutment 54 carried by the fixed templet for engagement with an intermediate link, and coöperating with the abutment 54 there is a pair of contractile coil springs 55 each of which is connected with a terminal link so as to cause them to fill the space between the fixed and movable templet. By this arrangement of adjustable abutments for the links the spacing of the buttons and button holes may be accomplished from either a terminal marking device or an intermediate marking device, as desired.

The side margins of the machine bed 15 are provided with machined steps 56 Fig 2 and arranged for sliding movement over said steps is a work-carriage comprising the bars 57 which rest in said steps and a plate 58 secured to and connecting said bars. At the forward end of said carriage there is a handle 59 for the manual movement of the carriage. Arranged at the forward end of the plate 58 of the work-carriage there is a work-support 60 disposed transversely of the machine. In plan this work-support is of the same contour as the line of marking devices, and extended throughout a greater portion of the length thereof there is a slot 61 through which the marking devices extend when marking. In front or rear elevation one end portion of the work-support is bent out of the plane of the body of the work-support, and secured at the extremity of said bent portion there is a contractile coil spring 62 which is secured to a hanger 63 carried by the carriage. The office of said spring and bent end of the work-support is to normally hold the body of the work-support elevated from the plate 58 of the carriage in a position to receive work, as clearly shown in Fig. 2.

In practice I contemplate the employment of two of the work-supports 60, one arranged to conform with the right set of marking devices and the other arranged to conform with the left set of marking devices. Secured to the carriage plate 58 adjacent each of its side margins is a slotted block 64 Fig. 4 and hingedly connected with each block is an arm 65. Detachably and adjustably secured to the free ends of the arms 65 is a work-clamp 66. The outline of the work-clamp is the same as the work-support and, like the work-support, is provided with a slot 67 extending throughout the major portion of its length. In practice I contemplate the employment of only one of such clamps for use in connection with both right and left sets of marking devices, as it is practicable to adapt the clamping devices to either set of marking device by reversing the clamping device, end for end.

Projecting laterally from the plate 29 is a stud 68 Fig. 1 and secured to the hinged arms 65 carrying the clamping-member 66 is a wiper 69. When the operator moves the carriage outwardly to receive work the wiper 69 engages the fixed stud 68 and thereby it depresses the wiper, which in turn elevates the hinged arms carrying the clamp-member 66 to the position shown by dotted lines in Fig. 1. This opening or moving of the clamping-member frees the work-support so that the spring 62 will move the support to a position elevated from the carriage to receive work. After the work has been supplied to the support the operator grasps the handle of the carriage and moves it rearwardly. This movement frees the wiper 69 from the stud 68 and permits the clamp-member to be drawn by the springs 66ª Fig. 1 to engage the work, with sufficient force only to prevent relative movement of the pieces of the work.

To provide for automatically connecting and disconnecting the main shaft 21 with power, when the work-carriage is manually moved, I employ a pulley 70 arranged to be constantly driven by means of a belt 71 connected with a source of power, not shown. Carried by the pulley is a clutch-member 72 which is arranged for rotation at all times with the pulley, and carried by the shaft is a clutch-member 73 which is connected at all times to rotate with the shaft and to be moved into and out of engagement with the clutch-member 72 fixed to the pulley.

Pivotally connected with the sliding carriage there is a dog 74, Figs. 1 and 4 the free end of which inclines. On the side of the carriage in advance of the dog 74 is a bracket 75 carrying a set screw 76 which acts as a stop to limit one movement of the dog on its pivot. Projecting laterally from the arm 18 of the machine is a pair of vertically alining bearings 77 Fig. 2 through which there is mounted for vertical movement a rod 78.

Secured to the rod between the bearings 77 is an adjustable collar 79, and impinging between said collar and the lowermost bearing and embracing the rod 78 there is an extensile coil spring 80 whose office is to normally hold the rod elevated. The upper end of the rod 78 is arranged for engagement with the movable member 73 of the clutch, and when thus held elevated it acts to separate and hold separated for a limited time the clutch-members so that the pulley may rotate without effecting a rotation of the main shaft of the machine. The movable member 73 of the clutch is acted upon by a contractile coil spring, shown only by dotted lines in Fig. 2, to normally draw it to engage with the other clutch member, and the movable member is provided with an inclined face. In other words, the body portion of the movable member is of disk shape varying in thickness, so that the rod 78 when elevated will first engage the thinnest portion of the movable clutch member and, by reason of the increasing thickness of said member, separate it from the stationary clutch member. The clutch is of a common form and in its specific construction forms no part of my invention, the essential in this clutch mechanism being a one-cycle action.

Carried by the lower end of the rod 78 there is a roller 81 arranged to be acted upon by the inclined face of the dog 74 carried by the work-carriage. One of the bearings 77 carries a pin 82 which rides in a slot formed in the rod 78 which prevents rotation of the rod in order to hold the roller 81 in position to be acted upon by the dog on the work-carriage. Secured to the bars 57 of the work-carriage are the vertically slotted guides 83 Fig. 1 in which there is arranged for vertical movement a pair of arms 84 Fig. 4 which carry a curved and open-topped marking fluid fountain 85. It is to be noted that the arms 84 of the fluid fountain have relatively long faces at the points where they extend through the slotted guides 83, so as to prevent tipping of the fluid fountain when the fountain is raised and lowered.

86 designates bell crank levers pivotally connected to each side of the work-carriage, and pivotally connecting the short arms of the levers 86 with the arms 84 of the fountain are the links 87. For normally holding the bell cranks 86 at their one limit of movement there are the springs 88. Secured to the forward feet 16 of the machine there is a slotted U-shaped member 89 carrying a stud 90 arranged in the path of each of the bell cranks 86. By this means, when the carriage is moved forwardly to receive work, the fountain is elevated so that the marking devices will be dipped into the fluid carried by the fountain. As shown by dotted lines in Figs. 2 and 3, the movable member of the clutch comprises a cam of varying thickness and is of such shape as to time the movement of the needles so that they will be moved to a working position and return only, that is the shape of the cam when released permits only a single cycle of operation of the machine.

The clutch is of ordinary construction and forms no part of my invention.

In the practical operation of the machine, assuming the pulley to be in motion, that is connected with power and the work-carriage in the position shown in Fig. 1, the operator grasps the handle of the carriage and draws outwardly the entire carriage including the work-support and work-clamp. During this operation the wiper 69 engages the stud 68 and thus elevates the clamp, the work-support 60 being automatically moved to a position to receive work by means of the spring 62 Fig. 2. An upper, such as is shown in Figs. 8 and 9, is then threaded over the work-support beneath the work-clamp, the operator fixing the location of the upper by alining the free margin of the fly of the upper with the margin of the work-clamp. When the carriage is drawn outwardly to receive work the dog 74 is moved to a position in advance of the clutch-rod. The operator then grasps the handle of the carriage and moves the entire carriage rearwardly to its limit of movement. During this rearward movement of the carriage the wiper 69 is freed from the stud 68, so that the clamp, acted upon by the springs 66ª, holds the work in position. The springs 66ª of the clamp together with the weight of the upper moves the work-support downwardly to its limit of movement, where it will rest upon the carriage. This rearward movement of the carriage also causes the inclined face of the dog 74 to force downwardly the clutch-rod against the tension of its spring, thereby causing the clutch to automatically connect the shaft of the machine with the driven pulley. When the machine shaft is thus set in motion, the cam 22 engages the roller 23 carried by the vertically reciprocated head 19 and forces the head downwardly, carrying with it the marking devices which, in their movement, are forced through the work including the fly and both quarters of the upper and also through the slots of the clamp and work-support. The machine continues to operate until the cam has completed a full cycle and permitted the spring 28 to return the reciprocating head and marking devices to their initial positions. At this time, that is after a complete cycle of operation, the clutch automatically disconnects the shaft of the machine from the driven pulley.

It is to be observed that the operation just described consists only of causing the shoe upper to be perforated in order to mark the location of buttons and button holes. This answers for most grades of uppers, but when it is desired to mark uppers constructed of texture, such as canvas or the like, in which a perforation only would not make a sufficient mark, I employ needles bearing a section of absorbent material, and in connection with this form of needles I employ a marking fluid fountain which is automatically brought to a position dipping the needles into the fluid when the work-carriage is drawn outwardly to receive work, the fountain being dropped to a position removed from the path of the needles when the work-carriage is moved to an operative position.

For the reason that the line of curvature of buttons and button holes is different on right and left shoes, it is necessary to provide two distinct sets of marking devices, and in order that the machine is readily adaptable to either right or left shoes I mount both the right and left set of marking devices on a plate which may be pivotally or otherwise secured to the reciprocating head of the machine, so that either set of marking devices may be employed as desired.

To provide for a variation in the spacing of the needles, each needle is secured in a needle-holder carried on a link, the links being arranged between two templets, one of which is movable, the train of links having a fixed abutment and acted upon by a spring in opposition to the abutment so that, upon a variation of the space between the templets, the spring will move the links to effect a difference in the spacing of their individual members.

In some shoes it is desirable that the spacing be proportioned from one end of the upper, usually the bottom, and in other cases it is desirable to proportion the spacing from the break or instep of the upper. In the first instance the abutment for the links is at one end of the train of links and in the second instance the abutment is at the break or instep point of the curved margins of the templets.

The means for moving the templets comprises a dial bearing figures relating to the sizes of shoes. This dial coöperates with indicia relating to the desired number of buttons arranged on the front face of the plate which carries the templets. As shown in Fig. 2 the "1" on the dial registers with the mark of the indicia designated "12"; it is understood from this that twelve buttons will be placed upon a number one shoe upper at the desired points of spacing.

I claim:

1. In a shoe marking machine, a horizontally movable work support, a shoe marking device vertically movable over the work support, means for driving the shoe marking device comprising a one-cycle clutch, and means operable by the work support for throwing the one-cycle clutch in position to operate the marking device when the work support is manually moved underneath the marking device.

2. In a shoe marking machine, a movable work-carriage, a work-support movable with the carriage, a work-clamp movable with the carriage, and means for automatically elevating the work-support and the clamp when the carriage is moved to one position and lowering said work support and clamp when the carriage is moved to another position.

3. In a shoe marking machine, a movable work-carriage, a work-support movable with the work carriage, a work-clamp movable with the carriage, and automatic means arranged to elevate said support and clamp to position to receive work when the carriage is moved in one direction and to carry and hold the work to a marking position when the carriage is moved in another direction.

4. In a shoe marking machine, a reversible element, distinct sets of marking devices carried by the reversible element, and means associated with each set for varying the spacing of all of the marking devices thereof at the same time.

5. In a shoe marking machine, a pair of relatively movable templets, a plurality of links arranged with their ends to be guided by the opposing margins of said templets, a second plurality of links each pivotally connected with a pair of the first mentioned links, said second mentioned links arranged to be guided by the surfaces of said templets and constitute supports for the first mentioned links, a marking device carried by each of the links of the first mentioned plurality, and means for holding the links of the first mentioned plurality in position to be guided by the margins of said templets.

6. In a shoe marking machine, a fixed templet, a movable templet, a plurality of links arranged to support marking devices and to be guided by the opposed margins of said templets, a second plurality of links each of which connects a pair of the first mentioned links and is arranged to overlie said templets to constitute a support for all of the links, means for fixedly holding one of the links of the said first mentioned plurality, and means for causing the remaining links of said first mentioned plurality to be guided at all times by the margins of said templets.

7. In a shoe marking machine, a pair of templets having opposed curved margins, marking device carriers comprising distinct sets of links pivotally connected adjacent their ends, both sets of which are arranged to be guided by parts located between said templets and certain parts being arranged to overlap the margins of the templets and means for varying the spacing of said templets.

8. In a shoe marking machine, a vertically movable element, a set of marking devices carried by said element, a manually movable work-carriage, a marking substance-container movable with the work-carriage, and means for automatically moving said container to a position supplying said marking devices when the work-carriage is moved.

9. In a shoe marking machine, the combination with a normally idle power driven element and a plurality of shoe marking devices carried thereby, of a manually movable carriage, a support for shoe uppers arranged to rest on the carriage when the carriage is in a working position, a clamp arranged over said support and spring held to normally engage said support, means for automatically positioning said support to receive a shoe upper when the carriage is moved to its forward limit, and means for automatically moving said clamp away from said support when the carriage is moved to its forward limit.

In testimony whereof, I have signed my name to this specification, in presence of two subscribing witnesses.

WILLIAM C. WRIGHT.

Witnesses:
E. L. WALLACE,
E. M. HARRINGTON.

Copies of this patent may be obtained for five cents each, by addressing the "Commissioner of Patents, Washington, D. C."